United States Patent [19]
Haines

[11] 3,906,746
[45] Sept. 23, 1975

[54] UNIVERSAL JOINT SEALING
[75] Inventor: Charles W. Haines, Toledo, Ohio
[73] Assignee: Dana Corporation, Toledo, Ohio
[22] Filed: June 20, 1974
[21] Appl. No.: 481,292

[52] U.S. Cl. ............... 64/17 A; 277/95; 277/212 F; 308/187.2
[51] Int. Cl.² ............................................. F16D 3/26
[58] Field of Search .......... 64/17 R, 17 A; 308/36.1, 308/187.1, 187.2; 277/95, 205, 212, 212 F

[56] References Cited
UNITED STATES PATENTS

| | | | |
|---|---|---|---|
| 2,946,608 | 7/1960 | Gilbert | 308/36.1 |
| 3,138,942 | 6/1964 | Kayser | 64/17 A |
| 3,162,471 | 12/1964 | Mazziotti | 308/36.1 |
| 3,174,813 | 3/1965 | Selz | 308/187.2 |
| 3,266,269 | 8/1966 | Stokely | 64/17 |
| 3,377,820 | 4/1968 | Smith | 308/187.1 |
| 3,588,129 | 6/1971 | Pitner | 277/95 |
| 3,854,733 | 12/1974 | Wilson | 277/95 |

*Primary Examiner*—Robert I. Smith
*Attorney, Agent, or Firm*—Robert E. Pollock

[57] ABSTRACT

Disclosed is a universal joint and an improved sealing arrangement therefor. The universal joint is of generally conventional arrangement and includes a cross having a trunnion at each end thereof, a bearing race on each trunnion and a pair of yokes each connected to an opposing pair of said bearing races.

In the preferred embodiment the cross includes a conical shoulder adjacent each trunnion and the seal includes a first portion adjacent the trunnion, a second portion radially disposed and adjacent said bearing race and including a plurality of circumferential ribs and a third portion engaging said conical shoulder and including a plurality of circumferential ribs.

4 Claims, 4 Drawing Figures

UNIVERSAL JOINT SEALING

BACKGROUND OF THE INVENTION

This invention relates to universal joints and more particularly to improved sealing arrangements therefor.

Universal joints of the so called Cardan type are well known in the art and have been widely used for a considerable period of time. Despite the wide acceptance and use of such joints, however, sealing of the bearings is critical for good performance and without careful selection, design and testing problems still exist in the seal area. In general, the most satisfactory seals have been those comprised of elastomeric materials with a metal backing or reinforcing such as that shown, for example, in U.S. Pat. No. 3,479,840 which issed Nov. 25, 1969, to Richard P. Meyers. Although generally satisfactory, such seals are necessarily more expensive than seals manufactured of elastomeric materials alone and additional machining is generally required on the journal cross.

Seals made solely of elastomers have been widely accepted due to their relatively lower cost in spite of their lesser sealing efficiency. Continuing efforts have been directed to improving the performance of all-elastomeric seals. U.S. Pat. No. 3,788,100 which issued to Alfred Pitner on Jan. 29, 1974, illustrates several embodiments intended to improve the performance of an all-elastomeric seal. The thrust of this patent is to eliminate rotation between the cross and the seal and a variety of complex means, generally including additional machining of the cross, are employed.

Prior art universal joint seals have generally been designed to function either with a prelubricated bearing or with a relubricatable bearing and different seal designs were generally required to meet these varying conditions.

Accordingly, it is an object of the present invention to provide an all-elastomeric seal with performance exceeding that generally available from such seals and approaching that of metal-backed seals.

It is a further object of this invention to provide such a seal which functions well without requiring additional and costly machining operations to the cross.

Further, it is an object of this invention to provide such a seal which can be used in universal joints whose applications require either prelubricated or relubricatable bearing design.

SUMMARY OF THE INVENTION

The above and further objects of this invention are provided in a universal joint having a cross with a trunnion at each end thereof, bearing cups and bearings on each trunnion and a pair of yokes affixed to opposite pairs of said cups. The cross includes a conical shoulder sloping outwardly and downwardly away from each trunnion. The seal includes a first portion adjacent the trunnion, a second generally radial portion adjacent the bearing cup and including a plurality of circumferential ribs and a third portion generally conical and adjacent the conical shoulder and including a plurality of circumferential ribs.

BRIEF DESCRIPTION OF THE DRAWINGS

While the specification concludes with claims which particularly point out and distinctly claim the subject matter forming the present invention, it is believed the same will be better understood with reference to the following specification and the accompanying drawings in which:

DESCRIPTION OF THE PREFERRED EMBODIMENTS

Figure 1:
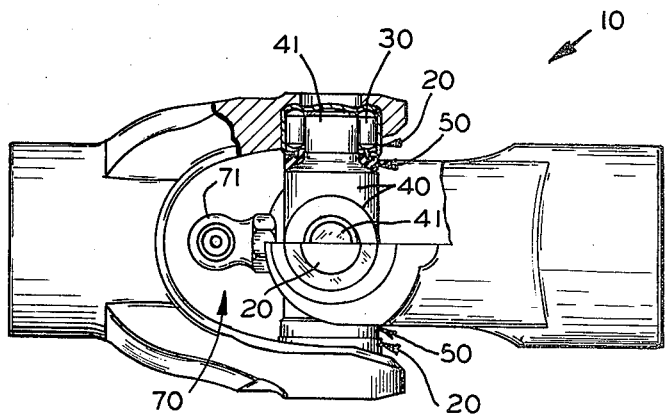
FIG. 1 is an overall view of a preferred embodiment of the universal joint of the present invention, partially cut away and fragmented for clarity.

Referring now to the drawings and particularly to FIG. 1 thereof a universal joint of generally conventional configuration is shown. Briefly, the joint consists of a pair of yoke members designated generally by the numeral 10 and adapted to connect rotatable shafts or the like. The yoke members 10 engage opposite pairs of bearing cups 20 which retain bearings 30 adjacent the distal ends of cross 40. Seals 50 engage the cross 40 and bearing cups 20 to retain lubricating oil or grease therebetween. The bearings 30 can be of the so called prelubricated type or, optionally, the joint can include a lubrication means, designated generally by the numer 70 to allow periodic relubrication. Such lubrication means includes the external lubrication fitting 71 connected, in the known manner, to internal lubrication passageways, not shown.

Figure 2:
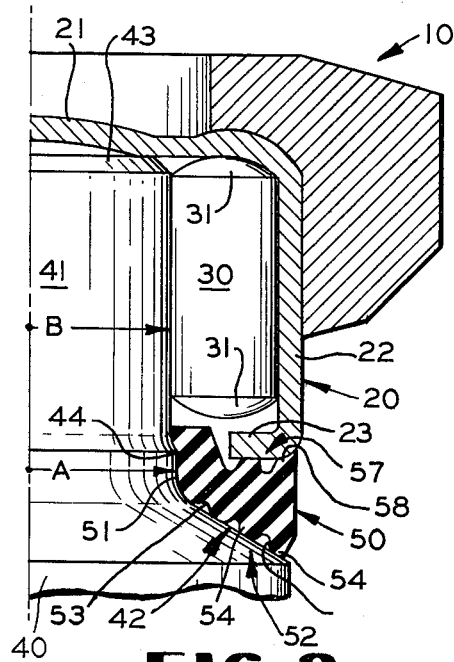
FIG. 2 is a partial, enlarged cross-sectional view of the universal joint of FIG. 1 showing the cross, bearings and seal thereof.

Referring now to FIG. 2, the details of the present invention in the general area of the seal are shown in more detail. The bearing cup 20, in the embodiment shown in FIG. 2, is a unitary cold formed metallic member and includes an end plate 21 in contact with the distal end of the cross 40, a cylindrical wall 22 depending from end plate 21 and terminating in an inwardly turned lip 23.

The bearings 30 will generally be of the roller type and may either include generally spherical ends 31 or terminate in flat ends. Generally, although not necessarily, the bearings 30 will be of the straight roller variety. When using the cold formed bearing cup as shown in FIG. 2 the bearing 30 is restrained and confined by the lip 23, cylindrical wall 22, the end plate 21 and the trunnion 41 of the cross 40.

Normally, the cross 40 comprises a single steel forging. The forging is initially turned to provide cylindrical trunnions 41 having a radius A and the turning is continued to provide a semifinished shoulder 42. The shoulder 42 is at an angle of about 10° to about 50° to horizontal and preferably at about 20° to 40° to horizontal. Particularly preferred is the configuration shown in FIG. 2 wherein the shoulder 42 is at an angle of approximately 30° to horizontal.

Following the rough turning of the trunnion 41 and the shoulder 42, a suitable bearing surface is provided on the trunnion 41 by plunge grinding or any other suitable means, thereby reducing the radius of the finished section to the dimension B. Normally, a chamfer 43 is provided at the distal end of the trunnion, in the well-known manner, to facilitate assembly of the joint. Finishing of the trunnion 41 normally results in a radial step 44 at or near the junction of the trunnion 41 and shoulder 42 of about 1/32 inch.

The seal 50 can be of any of the elastomeric materials commonly used for such seals. For most applications nitrile "rubbers" are preferred and Buna-N is a particularly preferred one of such elastomers. For high temperature applications (250°–400°F), polyfluronated "rubbers" as exemplified by that sold under the trademark VITON are preferred.

The seal 50 includes a trunnion sealing portion 51 which is generally cylindrical. Although this portion can be ribbed or stepped to correspond to the step 44 on the trunnion, it is preferably of straight cylindrical cross-section and sized to be about 5% smaller in inside diameter than the machined portion (corresponding to the B dimension) of the trunnion 41. Such a geometry results in a tight fit about the A dimension, thereby inhibiting relative rotation of the seal 50 and trunnion 40.

Figure 4:
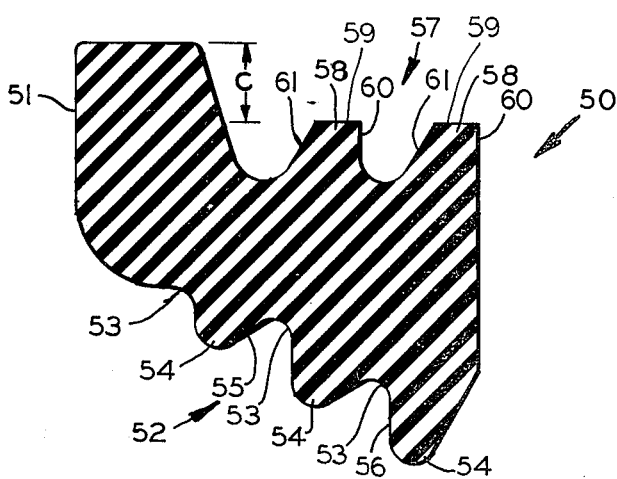
FIG. 4 is a partial vertical cross-sectional view of the seal shown in FIGS. 1 – 3 prior to installation on a universal joint.

Adjacent the trunnion seal 51 is a conical shoulder 52 which generally matches, in angle and dimensions, the shoulder 42 on the cross 40. The shoulder 52 includes at least one and preferably two or more concentric circumferentially spaced grooves 53 which form ribs 54 therebetween. Particularly preferred is the embodiment, shown most clearly in FIG. 4, wherein three grooves 53 are provided on approximately even spacing resulting in three concentric ribs 54. The preferred rib configuration includes a first portion 55 which slopes upwardly and outwardly from the shoulder 42 of the cross to which it will be applied and a second portion 56 which is generally vertical. The ribs 54 provide a good seal against the shoulder 42 and, at the same time provide a limited, but valuable, amount of adjustability to compensate for spacing variations between the shoulder 42 and the lip 23 of the bearing cup 20. Preferably, the portions 55 and 56 of the ribs 54 are symmetrical and at an angle of approximately 60° with respect to the shoulder 42 of the cross 40. The seal 50 also includes a generally radially disposed shoulder 57 opposite the conical shoulder 52 and adapted to abut the bearing cup 20. The shoulder 57 includes at least two coaxial circumferential ribs 58 comprised of a generally flat radial face 59, an outer vertical face 60 and an inner face 61 which slopes upwardly and outwardly as it progresses toward the bearing cap 20. The double rib configuration provides an excellent resistance to the entrance of foreign matter such as water and mud and the rib configuration biases the ribs 58 outwardly, thereby facilitating relubrication, where desired. At the same time, the seal configuragion retains lubrication satisfactorily for "permanent" lubrication applications.

Preferably the trunnion sealing portion 51 of the seal will extend axially of the trunnion by a distance C beyond the axial extent of the shoulder 57. Such an extension serves to improve the seal between the seal 50 and the trunnion 41.

Figure 3:
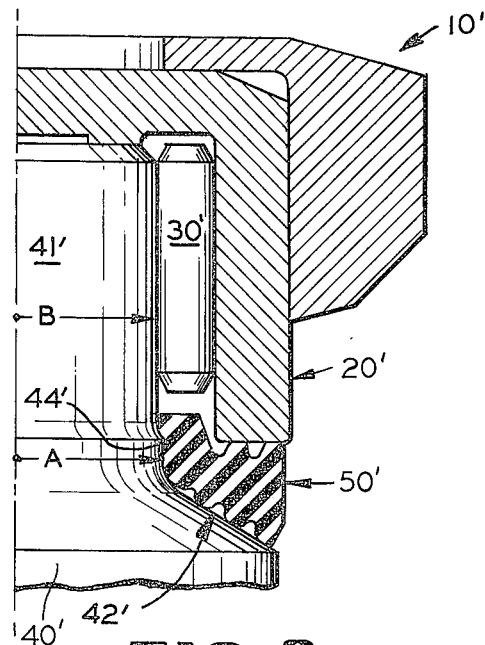
FIG. 3 is a partial, enlarged cross-sectional view generally corresponding to FIG. 2 but showing a variation of bearing cup design.

Referring now to FIG. 3, there is shown a variation of the present invention and parts therein corresponding to those in FIG. 2 are similarly numbered but designated with a "prime". The principal difference in FIG. 3 is the use of a bearing cap 20 which does not include a lip such as 23 in FIG. 2. The bearing cap 20 is preferably machined from a single piece of stock, but can be formed by any other suitable technique. As a result of the absence of a lip on the cap 20 the bearing is retained, axially, by the aforementioned trunnion sealing portion 51. Such retention is particularly important when dealing with flat-ended bearings 30 to keep such bearings from being pinched between the cap 20 and the step 44.

As will be appreciated from the foregoing, there has been provided a highly versatile seal suitable for use with prelubricated or relubricatable bearings and with differing bearing cap designs. Further, the seal, while all elastomer performs better than previous examples of such seals and approaching that of metal backed seals. The design of the seal, and particularly the adjustability built into it provides excellent sealing without extra or highly accurate machining requirements for the cross 40 or bearing cap 20.

Many variations will occur to those skilled in the art with with reference to the above description of the preferred embodiments. That description is intended to be illustrative and not limiting.

What is claimed is:

1. In a universal joint comprising a cross with a trunnion at each end thereof, a bearing and bearing cap on each trunnion and a pair of yokes, each connecting an opposite pair of said caps, the improvement wherein said cross includes a conical shoulder adjacent and sloping outwardly away from each trunnion and a seal comprising a generally cylindrical internal wall, a conical shoulder portion adjacent said wall and sloping outwardly therefrom, said seal shoulder including at least two concentric circumferential ribs thereon and a radially extending shoulder generally opposite said conical shoulder and including at least two concentric circumferential ribs thereon surrounds said trunnion and sealing engages said shoulder on said cross and said bearing cap.

2. The universal joint of claim 1 wherein said cylindrical internal wall of said seal extends axially beyond said generally radial shoulder of said seal.

3. The universal joint of claim 1 wherein said ribs on said generally radial portion of said seal include an inner wall portion sloping upwardly and outwardly with respect to said conical shoulder and an outer wall portion extending generally axially of said seal.

4. The universal joint of claim 3 wherein said cylindrical internal wall of said seal extends axially beyond said generally radial shoulder of said seal.

* * * * *